May 9, 1933. G. HELTON 1,908,146
POLE SLING
Filed Jan. 21, 1932

INVENTOR.
Glen Helton
BY
ATTORNEY.

Patented May 9, 1933

1,908,146

UNITED STATES PATENT OFFICE

GLEN HELTON, OF JOPLIN, MISSOURI, ASSIGNOR OF ONE-HALF TO P. MONTAGUE, OF INDEPENDENCE, MISSOURI

POLE SLING

Application filed January 21, 1932. Serial No. 587,935.

This invention relates to improvements in pole slings and more particularly to a device used in erecting poles for example to support wires and which can be readily released from the poles.

The present manner of erecting such poles is to wrap a chain or cable around a pole at the proper distance from its butt, secure a line from a derrick thereto, then raise the pole and lower the butt into the hole prepared for its reception, after which a lineman must ascend the pole and remove the chain or cable. This work is extremely dangerous because at this time the pole is only loosely supported in the hole and is free to swing, which frequently occurs, and such swinging is apt to dislodge the lineman, causing him to fall and resulting in serious accidents and even death. With my device, however, the sling can be released from the ground, thereby eliminating the danger of a lineman falling while releasing the raising line from the pole.

Another advantage of my device is that by pulling on the release line the sling can be readily drawn to the ground.

In accomplishing these and other objects of my invention, I have provided improved details of structure, the preferred forms of which are illustrated in the accompanying drawing, wherein.

Figure 1:
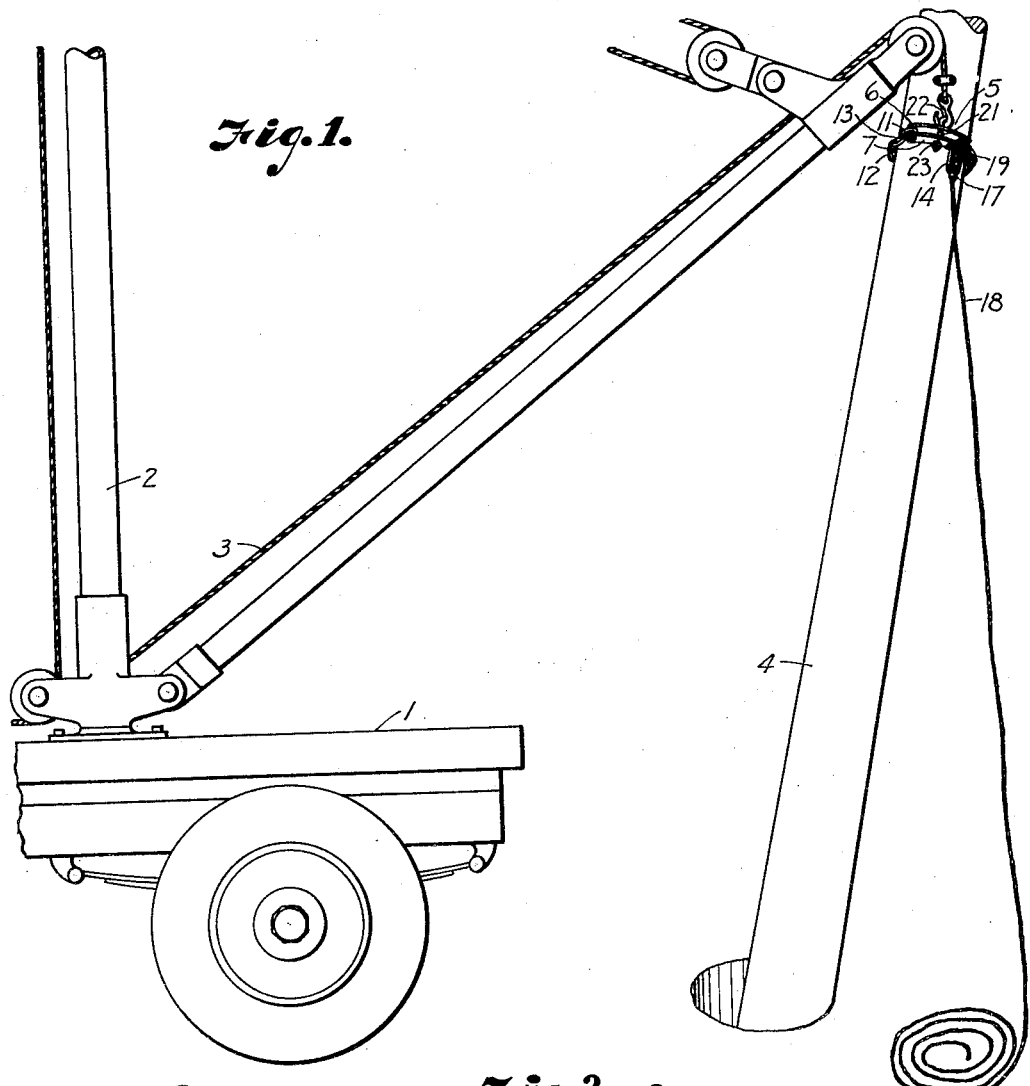
Fig. 1 is a perspective view of a pole just erected with my sling in position thereon and ready to be released.
Figure 2:
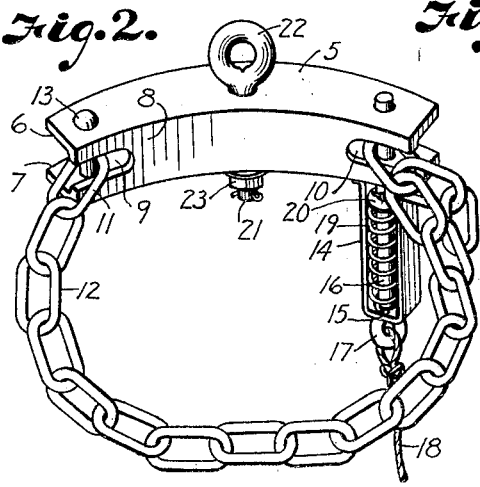
Fig. 2 is a perspective view of the sling showing the manner of securing the chain.
Figure 3:
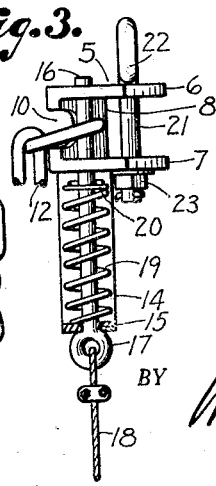
Fig. 3 is an end view of the sling with the latch bracket in section.

Referring to the drawing in detail:

1 represents the rear end of a vehicle on which is mounted a derrick 2 having the usual hauling line 3, and 4 represents a pole which has just had its butt lowered into a hole.

My sling consists of a body portion or yoke 5, preferably made from a channel iron and having parallel flanges 6 and 7 which are connected by a web 8. The web 8 is provided with slots 9 and 10 at opposite ends of the yoke and preferably extending inwardly from its ends. The end 11 of a chain or flexible member 12 is passed into the slot 9, and a pin 13 is inserted through the openings which have been formed through the flanges 6 and 7 in axial alignment with each other and adjacent the ends of the flanges so that the pin 13 will be to the rear of the slot 9. The ends of the pin 13 are then secured in the flanges by riveting, welding, or any other well known manner, and thus one end of the chain 12 is permanently secured to the yoke 5.

Secured to the lower face of the flange 7 is a U-shaped bracket or housing 14 having an opening 15 in its closed end. Openings are also formed through the flanges 6 and 7 in axial alignment with each other and with the opening 15. A latch or pin 16 extends slidably through these openings and is provided on its lower end with an eye 17 in which a line or flexible member 18 is secured.

Surrounding the pin and located in the bracket or housing 14 is a spring or resilient member 19 having its one end abutting the closed end of the bracket and its other end thrusting against a washer or abutment 20 carried by the latch or pin 16, and in this manner the latch or pin 16 is normally held in latching position.

Formed through the flanges 6 and 7 and preferably midway the ends thereof are axially aligned openings in which the shank 21 of an eye-bolt 22 is rotatably mounted. A nut 23 is secured to the lower end of the shank to hold the eye-bolt in position, but it is not drawn tight enough to bind the eye-bolt in the yoke or body portion 5, and thus form a swivel.

The yoke or body portion 5 is made arcuate or curved longitudinally, and has the flanges 6 and 7 extending outwardly so that the web 8 will contact the pole when the device is attached thereto and thus prevent, to a great extent, any marring of the pole.

The operation of my device is as follows:

The yoke 5 is placed at a selected point on a pole lying on the ground and the chain 12 is then passed around this pole and pulled taut. The latch 16 is next pulled against the thrust of the spring 19, which withdraws the end of the pin from the opening in the flange 6. A selected link of the chain 12 is then passed through the slot 10 and the latch 16 released, when the spring 19 will again move the end of the pin into the opening in the flange 6, thereby securing the chain around the pole. The hauling line 3 is then attached to the eye-bolt 22 and the pole placed in the hole in the usual manner.

In order to release the chain, it is only necessary to pull on the line 18, which will move the pin 16 against the thrust of the spring 19 and withdraw it from the link of the chain 12 through which it has been passed, permitting the link to pass out of the slot, thereby releasing the chain from the pole. The line 18 is now used as a down haul in bringing the device down to the ground.

Care must be taken when latching an intermediate link in the yoke that the remaining or free end of the chain does not pass to the rear of the web 8, because then there would be a possibility of one of the links being in such a position that it would not pass through the slot, making it necessary to climb the pole to release the device.

In addition to having the advantage of being capable of release from the pole without the necessity of climbing a wabbly pole and its attendant danger, my device is also readily adjustable to different diameters of poles.

The yoke also has a tendency to cant or tip while in use, thus assuring a firm grip on the pole and practically no marring effect.

My device can also be used in raising metal or concrete poles or pipes to facilitate application and release of the sling, for example to eliminate the present dangerous practice of placing a ladder against a wabbly pole for releasing a sling therefrom.

It is obvious that the pin 16 need only be withdrawn from the opening a sufficient distance from the flange 6 to allow release of the link, and thus the flange 7 and the closed end of the bracket or housing act as a guiding means for the latch pin 16, thereby assuring its entrance into the opening in the flange 6 when moved under the influence of the spring or resilient member 19.

What I claim and desire to secure by Letters Patent is:

1. A pole sling comprising a longitudinally curved yoke, a chain secured at one end to an end of said yoke, slidable latching means located at the opposite end of said yoke and adapted to engage a link of said chain for securing the same around a pole, resilient means for retaining said slidable means in latching position, means operable remote from said yoke for moving said slidable means out of latching position, thereby releasing said chain from said pole, and an eye-bolt swivelly carried by said yoke intermediate its ends.

2. In a pole sling, a longitudinally arcuate yoke comprising a web having slots at each end and provided with parallel rearwardly extending upper and lower flanges, a pin carried by said flanges adjacent one end and to the rear of one of said slots, a flexible member secured to said pin, a U-shaped bracket secured to the under side of the lower flange adjacent its opposite end, a latching pin extending slidably through the closed end of said bracket and through said flanges and to the rear of the remaining slot, means for urging said latching pin in one direction, means for withdrawing said pin from the upper flange, and means swivelly carried by said flanges intermediate their ends for the attachment of a haul line.

3. A pole sling including an arcuate body member formed of channel iron with its flanges extended outwardly to permit contact of its web with a pole and having slots in the ends of the web, a flexible member pivotally mounted in one of said slots, a latch for adjustably anchoring said member in the opposite slot, a pull line for actuating the latch, and means for suspending the sling.

4. A pole sling including an arcuate body member formed of channel iron with its flanges extended outwardly to permit contact of its web with a pole and having slots in the ends of the web, a flexible member permanently, pivotally mounted in one of said slots, a latch for adjustably anchoring said member in the opposite slot, a pull line for actuating the latch, and means for suspending the sling.

5. A pole sling including an arcuate body member formed of channel iron with its flanges extended outwardly to permit contact of its web with a pole and having slots in the end of the web, a chain permanently pivotally anchored in one of said slots, a latch pin yieldingly mounted on the opposite end of said body for removably anchoring the loose end of the chain by projection through a selected link positioned in the adjacent slot, a pull line for actuating the pin to release the loose end of the chain, and elevating means connected with said body member.

In testimony whereof I affix my signature.

GLEN HELTON.